United States Patent Office 3,775,505
Patented Nov. 27, 1973

3,775,505
SATURATED HYDROCARBON DISPROPORTIONATION AT LOW TEMPERATURES
Thomas R. Hughes, Orinda, Calif., assignor to Chevron Research Company, San Francisco, Calif.
Filed Jan. 16, 1970, Ser. No. 3,303
Int. Cl. C07c 3/00, 9/00
U.S. Cl. 260—676                7 Claims

ABSTRACT OF THE DISCLOSURE

A process for disproportionation of saturated hydrocarbons which comprises contacting the saturated hydrocarbons at a temperature below 800° F., and in the presence of no more than 5 weight percent olefin, with a catalytic mass having catalytic activity for dehydrogenation as well as catalytic activity for olefin disproportionation.

BACKGROUND OF THE INVENTION

Field of the invention

The present invention relates to the conversion of saturated hydrocarbon feeds to hydrocarbon products with different distributions of molecular weights than those of the feeds. More particularly, the present invention relates to disproportionation of saturated hydrocarbons.

The term "disproportionation" is used herein to mean the conversion of hydrocarbons to new hydrocarbons of both higher and lower molecular weight. For example, pentane may be disproportionated according to the reaction:

$$2C_5H_{12} \rightleftharpoons C_4H_{10} + C_6H_{14}$$

"Saturated hydrocarbon" as used herein includes hydrocarbon molecules which are completely saturated with hydrogen and/or hydrocarbon molecules which are partially saturated with hydrogen but contain at least one alkyl group which is completely saturated with hydrogen. Thus, the term "saturated hydrocarbon" as used herein includes alkanes (paraffins); alicyclics (cycloparaffins); branched-chain alkanes; alicyclic hydrocarbons with one or more attached alkane groups; and unsaturated hydrocarbons with one or more attached, completely saturated hydrocarbon groups, as, for example, an aromatic hydrocarbon with an attached alkane. From the description hereinbelow, it will become apparent that in the instance of unsaturated hydrocarbons with an attached, completely saturated hydrocarbon group the conversion process of the present invention operates by way of the completely saturated hydrocarbon group.

Prior art

A number of processes have been disclosed for converting various hydrocarbons to higher molecular weight hydrocarbons. For example, polymerization has been proposed for increasing the molecular weight of hydrocarbons such as gaseous, or low-boiling olefins. Various processes for olefin polymerization have been disclosed, including processes wherein the polymerization reaction is catalyzed with inorganic acids such as sulfuric or phosphoric.

To obtain the olefinic feed for a polymerization reaction, both thermal cracking and catlytic dehydrogenation processes have been proposed. For example, a two-stage process has been proposed wherein hydrocarbon gases are first cracked to form substantial amounts of olefins. Then the olefins are polymerized to higher-boiling compounds by contacting the olefins with a catalyst adapted to promote the forming of heavier hydrocarbons by polymerization.

U.S. Pat. 1,687,890 is directed to a process of converting low-boiling point hydrocarbons into higher-boiling point hydrocarbons by mixing a hydrocarbon vapor with steam and then contacting the steam-hydrocarbon mixture with iron oxide at temperatures in excess of 1112° F. It is theorized in U.S. Pat. 1,687,890 that the following reactions may be involved to a greater or lesser extent:

"1. Paraffin hydrocarbons on being brought into contact with ferric oxide at elevated temperatures are oxidized or dehydrogenated, forming unsaturated hydrocarbons.

"2. Unsaturated hydrocarbons of low molecular weight polymerize into unsaturated hydrocarbons of higher molecular weight when subjected to elevated temperatures, the extent of polymerization depending upon the temperature and duration of treatment.

" . . .

"7. Unsaturated hydrocarbons are hydrogenated by nascent hydrogen."

Another process which has been proposed for converting hydrocarbons to higher molecular weight hydrocarbons is olefin disproportionation. Numerous methods and catalysts have been disclosed for the disproportionation of olefins. In most of these processes, the olefin is disproportionated by contacting with a catalyst such as tungsten oxide or molybdenum oxide on silica or alumina at a temperature between about 150° and 1100° F. and at a pressure between about 15 and 1500 p.s.i.a. These prior art processes have been directed to an effective method to convert essentially only olefins, not saturated hydrocarbons, to higher molecular weight hydrocarbons by disproportionation.

For example, in U.S. Pat. 3,431,316, an olefin disproportionation process is disclosed, and it is stated that, if desired, paraffinic and cycloparaffinic hydrocarbons having up to 12 carbon atoms per molecule can be employed as diluents for the reaction; that is, the saturated hydrocarbons are nonreactive and merely dilute the olefins which are the reactants.

A process for the direct conversion of saturated hydrocarbons to higher molecular weight hydrocarbons would be very attractive because in many instances saturated hydrocarbons are available as a relatively cheap feedstock. For example, in many instances, excess amounts of propane and/or butanes are available in an over-all refinery operation.

Processes which have been previously reported wherein saturated hydrocarbons are disproportionated include contact of saturated hydrocarbons with solid catalyst comprised of AlCl₃ on Al₂O₃ and contact of saturated hydrocarbons with a promoter comprised of alkyl fluoride and BF₃. The use of the AlCl₃ solid catalyst was uneconomic because, among other reasons, the catalyst was non-regenerable. The use of alkyl fluoride and BF₃ was unattractive because of severe corrosion, sludge formation and other operating problems.

In the past it has been the practice to convert saturated hyrocarbons, particularly normal alkanes, to olefins as a separate or distinct step and then to disproportionate the olefins to valuable higher molecular weight hydrocarbons. For example, in U.S. Pat. 3,431,316, saturated light hydrocarbons are cracked to form olefins, and then the olefins are separated from the cracker effluent and fed to a disproportionation zone wherein the olefins are disproportionated to higher molecular weight hydrocarbons. Thus, a separate step is used to obtain olefins, because, according to the prior art, no economically feasible process is available for the direct disproportionation of saturated hydrocarbons.

U.S. Pat. 3,445,541 discloses a process for the dehydrogenation-disproportionation of olefins and paraffins, using a combined dehydrogenation and disproportionation catalyst. According to U.S. Pat. 3,445,541, a hydrocarbon feed which is either an acyclic paraffin or acyclic olefin having 3-6 carbon atoms is contacted with the catalyst at conditions of temperature and pressure to promote dehydrogenation and disproportionation. It is said that the process can be carried out at temperatures between 800° F. and 1200° F.; however, the lowest temperature used for processing a paraffin in accordance with any of the examples of U.S. Pat. 3,445,541 is 980° F., and typically the temperature used is between 1040° F. and 1125° F.

The high temperature process disclosed in U.S. Pat. 3,445,541 is shown therein to result in only relatively low yields of saturated higher molecular weight hydrocarbons. The U.S. Pat. 3,445,541 process operates with a substantial amount of olefins in the reaction zone and thus with about 10 to 50 volume percent or more olefins in the effluent from the disproportionation reaction zone.

SUMMARY OF THE INVENTION

According to the present invention, a process is provided for disproportionation of saturated hydrocarbons at a temperature below 850° F., and much more preferably below 800° F., and in the presence of no more than 5 weight percent olefins, which process comprises contacting the saturated hydrocarbons with a catalytic mass having catalytic activity for olefin disproportionation.

More broadly, the present invention is directed to operating the saturated hydrocarbon disproportionation zone in the presence of no more than 5 weight percent olefins.

A catalytic mass comprising a physical mixture of catalyst particles which are active for dehydrogenation and catalyst particles which are active for olefin disproportionation has been found to be effective for disproportionation of saturated hydrocarbons when employed in accordance with the present invention. In the process of the present invention, it is important that the two types of catalysts be in close proximity to one another. By "close proximity" is meant a distance less than a few inches and preferably of the order of a few inches or less.

Ordinarily the dehydrogenation component will, of course, be a dehydrogenation-hydrogenation component in accordance with standard principles of catalysis.

Although not to be construed as a binding theory of operation restricting the scope of the present invention or discovery, it is believed that the process may take place by virtue of the formation from the reactant saturated hydrocarbons of a relatively small amount of olefins (reactant olefins) which migrate to the nearby active sites of the olefin disproportionation catalyst component and are disproportionated to form different olefins (product olefins). Although a method might be devised to withdraw the product olefins at this point, normally the product olefins are not withdrawn, but instead migrate to active sites of the dehydrogenation-hydrogenation component where they are hydrogenated. It is believed that the success of the reaction of the present invention is partially due to a steady or continued removal of the product olefins formed in the reaction zone. The reactant olefins formed as intermediates are disproportionated to form product olefins and then product olefin removal is generally accomplished by hydrogenation of the product olefins, thus achieving a favorable equilibrium situation for the formation of additional reactant olefins, which olefins, in turn, may be disproportionated and hydrogenated in the reaction zone to form additional saturated product hydrocarbons of molecular weights other than that of the feed components, and so on.

It will, of course, be recalled that for most reversible or equilibrium limited reactions (such as would be the case with the reactant olefin formation), the net rate of formation of product is increased by maintaining low concentration of product in the reaction system, as opposed to a relatively high concentration of product in the reaction system. Thus, in the present process, it is believed that the net reaction rate of reactant saturated hydrocarbons to form reactant olefins is increased or maintained at a relatively high level by virtue of the fact that reactant olefins are constantly being consumed by the olefin disproportionation reaction which simultaneously occurs in the reaction zone. The product olefins formed by disproportionation are, in turn, maintained at low concentration in the reaction zone, preferably by hydrogenation to product saturated hydrocarbons. This hydrogenation serves the additional function of consuming the hydrogen originally produced by dehydrogenation of the feed saturated hydrocarbons.

As a condition of operation of the present invention, it is critical that the olefin concentration be maintained relatively low; in accordance with our present findings, the olefin concentration in the reaction zone is to be maintained below 5 weight percent. For purposes of the present invention, the olefin concentration in the reaction zone is determined by analysis of the reaction zone effluent.

As discussed above, it is believed that one reason for the success of the process of the present invention is that the reactant olefins are constantly being consumed by disproportionation and the product olefins by hydrogenation to product saturated hydrocarbons, thereby establishing a favorable equilibrium situation and allowing further desired reaction in the reaction zone. We have found that it is undesirable to have considerable amounts of olefin present in the reaction zone and that the addition of olefin to the feedstock to the reaction zone will tend to kill the disproportionation reactions desired in accordance with the process of the present invention. This was a surprising finding, especially in view of the fact that it was initially thought that the desired disproportionation of reactant saturated hydrocarbons to product saturated hydrocarbons would be speeded up by the injection of suitable olefins into the disproportionation reaction zone. To the contrary, however, we have found that the addition of as little as one volume percent olefin (specifically propylene) dramatically reduced the conversion of saturated hydrocarbons (specifically n-butane) to product saturated hydrocarbon disproportionate. This is discussed further hereinbelow in conjunction with FIG. 3.

It is believed that the olefins are detrimental to the disproportionation reactions of the present invention because the olefins adsorb relatively strongly onto the hydrogenation-dehydrogenation catalytic sites and thus prevent the saturated hydrocarbon feedstock molecules from reaching these catalytic sites. In our laboratory work, we have noted that after the saturated hydrocarbon disproportionation has been substantially inhibited by the injection of olefins to the disproportionation reaction zone, most of the catalytic activity can be recovered by discontinuing the olefin injection to the reaction zone.

Other theories may be postulated as to why the presence of more than a few weight percent olefins in the reaction zone poisons the saturated hydrocarbon disproportionation reaction of the present invention. For example, certain work by Wood, reported on p. 30, vol. 11 of the Journal of Catalysis (1968), indicates that the presence of adsorbed hydrogen is necessary for cyclohexane dehydrogenation to occur. This adsorbed hydrogen may be selectively scavenged by substantial quantities of olefins present in the disproportionation reaction zone, thereby preventing the saturated hydrocarbon feedstock molecules from being dehydrogenated.

Whether because of a combination of the above theories, or one of the theories separately, or some other theory, the finding remains that the process of the present invention requires that the concentration of olefins in the disproportionation reaction zone be maintained at a low level.

It is also preferred in the process of the present invention to operate the reaction zone at a pressure above at least 100 p.s.i.g. The elevated pressure has been found advantageous because it leads to higher disproportionation conversion. The residence time of the reactant in the reaction zone increases with increasing pressure. Also, the equilibrium partial pressures of both olefin and $H_2$ formed from dehydrogenation of saturated hydrocarbons rise in direct proportion to the square root of the total pressure. The equilibrium concentrations of olefins, relative to those of the saturated hydrocarbons from which they are formed, are inversely proportional to the square root of the total pressure. Relatively high pressures, of the order of 500–1500 p.s.i.g., are particularly preferred.

While the process of the present invention requires that no more than 5 weight percent olefins be present in the reaction zone, it is preferred to maintain the olefin concentration still lower as, for example, below about 2 weight percent olefins, and still more preferably, below about 1 weight percent olefins. To maintain the olefin concentration at a relatively low level, various means may be employed. Temperatures below about 800° F. and elevated pressures above at least 100 p.s.i.g. are particularly desirable to maintain the olefin concentration at a relatively low level in the disproportionation reaction zone. In accordance with one particularly preferred embodiment of the present invention, the temperature in the disproportionation reaction zone is maintained below about 800° F., the pressure is maintained above at least 100 p.s.i.g., and the olefin concentration is maintained below about 0.5 weight percent.

Although it is advantageous to maintain the temperature in the reaction zone below about 850° F. and more preferably below about 800° F. in order to maintain relatively low olefin concentration, it is also particularly important to maintain the temperature below about 850° F., and more preferably below about 800° F. in order to obtain a relatively high yield of saturated hydrocarbons which are of higher molecular weight than the feed-saturated hydrocarbons. Thus, for example, when butanes or propane are fed to the disproportionation reaction zone, a much better ultimate yield of $C_5+$ material is obtained when operating at the relatively low temperatures. Temperatures in the range of 500° to 700° F. are particularly desirable. This aspect of the present invention is discussed hereinbelow in conjunction with FIG. 1.

Still further, the relatively low temperatures, particularly below 800° F., have been found by us to be extremely advantageous from the standpoint of catalyst stability. That is, the fouling rates of catalysts used in the process of the present invention have been found to be considerably lower when operating at the relatively low temperatures, i.e., below about 800° F., as opposed to operating temperatures above 800° F. and particularly operating temperatures above 850° F. This aspect of the present invention is discussed further hereinbelow in conjunction with FIG. 2.

In a preferred embodiment of the process of the present invention, the catalytic mass comprises catalyst particles having both catalytic activity for dehydrogenation and catalytic activity for olefin disproportionation. In certain instances, rather than forming the catalytic mass in the reaction zone by physical admixture of the two types of catalyst particles, it is more convenient and more desirable to use only one type of catalyst particle but, in accordance with the process of the present invention, this catalyst particle must have substantial catalytic activity for dehydrogenation as well as for olefin disproportionation.

Temperatures employed in the reaction zone usually are maintained between 400° and 850° F., preferably between 500° and 800° F., and still more preferably between 500° and 750° F. Feed to the disproportionation reaction zone is preferably butanes and/or propane, as a large increase in the value of these particular hydrocarbon feedstocks is obtained by the disproportionation reaction.

Another particularly preferred feed is the highly paraffinic raffinate resulting from the extraction of aromatics from a portion of the effluent from a catalytic reforming process. Typically, the raffinate is mostly $C_8$ and $C_9$ alkanes and has a relatively low motor fuel octane rating. By the disproportionation reaction of the present invention, the raffinate may be converted to higher octane light gasoline and to jet fuel.

The direct disproportionation of propane gives a relatively low yield of $C_5+$ paraffins, whereas the yield from butanes is much higher.

As defined previously, the term "saturated hydrocarbons" is used herein to include a large number of types of hydrocarbons. However, the process of the present invention is preferably carried out using alkanes as the feed-saturated hydrocarbons. As used herein, the term "alkanes" is used to mean hydrocarbons from the group of aliphatic hydrocarbons of the series $C_nH_{2n+2}$, excluding methane.

Feed hydrocarbons which are not converted in the disproportionation reaction zone preferably are recycled to the disproportionation reaction zone. Lower and higher molecular weight hydrocarbons formed in the disproportionation reaction zone preferably are removed from the unconverted feed prior to recycling the unconverted feed. For example, generally all of the ethane formed is removed in the disproportionation of propane, or of propane plus butanes. The low molecular weight hydrocarbons are removed in order to prevent their accumulation in the recycle stream to the disproportionation zone.

The catalytic mass used in the disproportionation reaction zone, according to the process of the present invention, must contain substantial activity for dehydrogenation of hydrocarbons such as alkanes, as well as substantial catalytic activity for olefin disproportionation. Preferably, the catalytic mass comprises a noble metal or a noble metal compound on a refractory support and a Group VI–B metal, or metal compound, on a refractory support. Thus, preferred catalyst masses include platinum-on-alumina particles mixed with tungsten oxide-on-silica particles.

In accordance with one preferred embodiment of the present invention, the feed-saturated hydrocarbons consist essentially of, or at least mostly of, just one carbon number saturated hydrocarbon such as propane; or normal butane with or without isobutane; or normal pentane with or without other $C_5$ carbon number saturated hydrocarbons such as the branched-chain pentanes; however, mixtures thereof, i.e., mixtures of any of the previously mentioned hydrocarbons, may also be disproportionated. The term "branched-chain" is used herein to connote hydrocarbons such as 2-methyl-butane or 2,2-dimethyl-propane, either of which would be referred to in accordance with common practice as branched-chain pentanes or branched-chain $C_5$ alkanes.

DETAILED DESCRIPTION OF THE DRAWINGS

Figure 1:
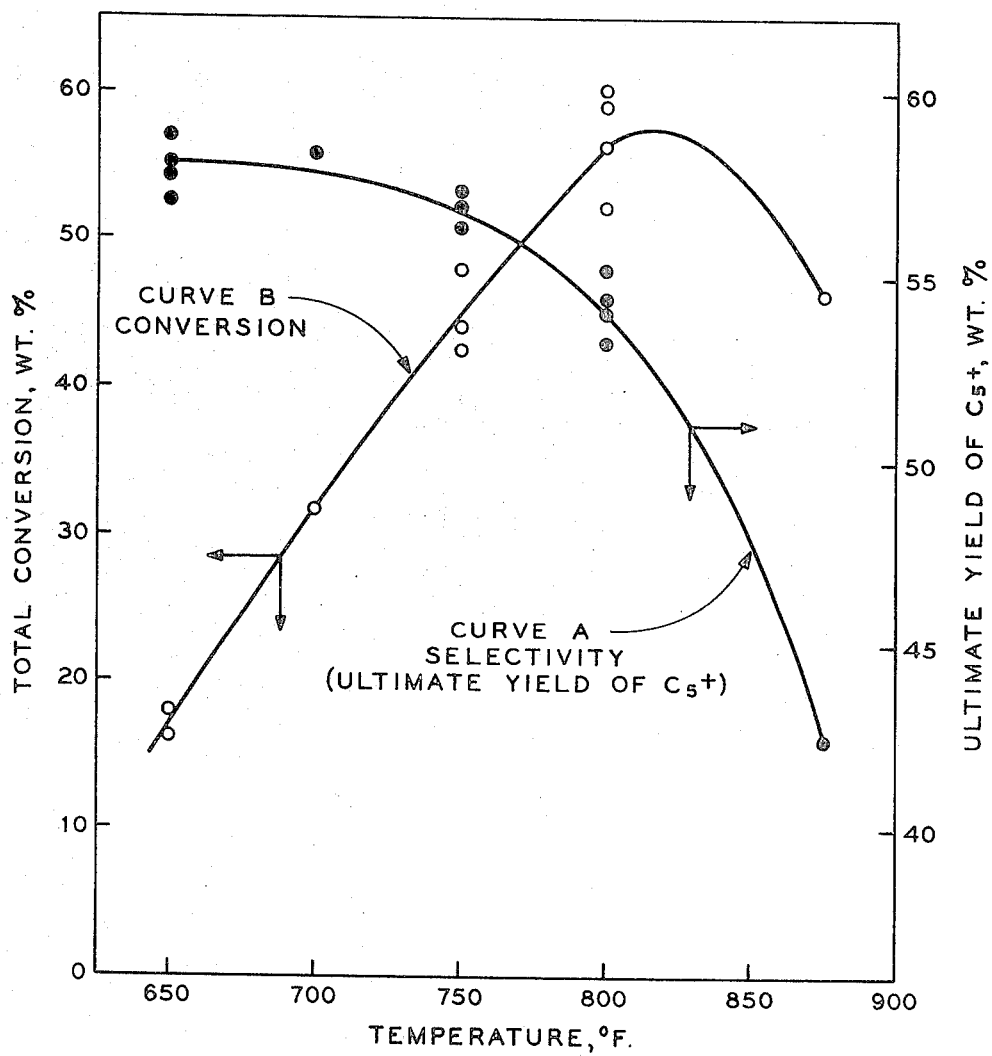
FIG. 1 is a graph showing the ultimate yield of $C_5+$ hydrocarbons versus temperature for the disproportionation of normal butane in curve A and percent total conversion versus temperature in curve B.

Referring now in more detail to FIG. 1, the data tabulated below in Table I shows the yield of various products for four different temperatures.

TABLE I

Weight percent product yields at various operating temperatures

| Product | 650° F. | 700° F. | 750° F. | 800° F. | 875° F. |
|---|---|---|---|---|---|
| He + $CH_4$ | 0.2 | 0.2 | 0.5 | 1.1 | 3.2 |
| $C_2H_6$ | 0.8 | 1.3 | 2.1 | 2.8 | 7.5 |
| $C_3H_8$ | 5.9 | 11.6 | 15.7 | 19.8 | 16.0 |
| $iC_4H_{10}$ | 0.1 | 0.1 | 0.2 | 0.4 | 0.5 |
| $nC_4H_{10}$ | 83.1 | 67.7 | 56.7 | 46.9 | 53.1 |
| $\Sigma\ C_4H_8$ | 0.5 | 0.4 | 0.5 | 0.5 | [4]N.M. |
| $\Sigma$ branched $C_5H_{12}$ | 0.06 | 0.1 | 0.2 | 0.5 | 0.8 |
| $nC_5H_{12}$ | 4.7 | 9.5 | 11.7 | 13.9 | 7.2 |
| $\Sigma\ C_5H_{10}$ | 0.1 | 0.1 | 0.2 | 0.2 | [4]N.M. |
| $\Sigma$ branched $C_6H_{14}$ | 0.03 | 0.1 | 0.3 | 0.8 | 0.9 |
| $nC_6H_{14}$ | 2.3 | 4.4 | 5.7 | 6.3 | 3.7 |
| $\Sigma\ C_6H_{12}$ | 0.1 | 0.1 | 0.2 | 0.4 | [4]N.M. |
| $\Sigma$ branched $C_7H_{16}$ | 0.009 | 0.05 | 0.2 | 0.3 | 0.6 |
| $nC_7H_{16}$ | 1.1 | 2.1 | 2.8 | 2.9 | 1.9 |
| $\Sigma\ C_7H_{14}$ | 0.02 | 0.05 | 0.08 | 0.06 | [4]N.M. |
| $\Sigma$ branched $C_8H_{18}$ | | 0.05 | 0.1 | 0.5 | 0.4 |
| $nC_8H_{18}$ | 0.5 | 1.0 | 1.3 | 1.3 | 1.0 |
| $\Sigma$ branched $C_9H_{20}$ | | 0.05 | 0.1 | | 0.7 |
| $nC_9H_{20}$ | 0.3 | 0.4 | 0.7 | | 0.5 |
| $\Sigma\ C_{10}+$ | | 0.3 | 0.5 | | 2.0 |
| $\Sigma\ C_1$-$C_3$ | 6.9 | 13.2 | 18.3 | 23.8 | 26.7 |
| $\Sigma\ C_5+$ | 9.4 | 18.4 | 24.2 | 28.4 | 19.7 |
| $C_5+$ ultimate yield[1] | 57.7 | 58.3 | 56.9 | 54.4 | 42.4 |
| $\Sigma$ olefins[2] | 0.7 | 0.8 | 0.9 | 1.2 | [4]N.M. |
| Percent branched chain in $C_5$-$C_9$ range[3] | 1.1 | 2.0 | 4.3 | 7.4 | 19.2 |

[1] $C_5+$ ultimate yield = $\Sigma\ C_5+/(\Sigma\ C_1$-$C_3 + \Sigma\ C_5+)$.
[2] All olefins analyses are from an approximate chromatographic analysis.
[3] The decrease in branching with decreasing temperature indicates the process of the present invention is more selective for pure disproportionation without isomerization at lower temperatures. This attribute is important when it is desired to produce n-paraffins, as, for example, in wax production.
[4] N.M. = Not measured because products were hydrogenated prior to analysis.

The data upon which FIG. 1 was based were obtained by contacting normal butane with a saturated hydrocarbon disproportionation catalyst mass under the following conditions.

Volume of catalyst in reactor: 9 cubic centimeters (cc.).
Type of catalyst:
    2 cc. of 0.5 wt. percent Pt; 0.5 wt. percent Re; 0.5 wt. percent Li on $Al_2O_3$.
    7 cc. of 8.0 wt. percent $WO_3$ on $SiO_2$.
    Both catalyst particles were 28 to 60 Tyler mesh size.
Operating conditions:
    Temperature[1]: 650°, 700°, 750°, 800°, 875° F.
    Pressure: 900 p.s.i.g.
    Feed rate: 9 cc./hour.

[1] Successive runs, of several hours each with no regeneration in between, were made at the temperatures specified, except that the catalyst was reactivated by flushing the catalyst overnight with hydrogen before the run at 875° F.

As can be seen from curve A in FIG. 1, the ultimate yield of $C_5+$ decreases considerably in moving from particularly preferred temperatures below 800° F. to temperatures in excess of 800° F. as, for example, temperatures as high as 875° F. where the ultimate yield of $C_5+$ drops to about 42 percent versus approximately 57 percent at 750° F.

The term "ultimate yield" is used herein to mean the yield of the specified material (e.g., $C_5+$) which would be obtained by recycling unconverted feed back to the disproportionation reaction zone, assuming no loss occurs due to the recycling. In particular, the data points used to obtain curve A in FIG. 1 are the calculated ultimate yield of $C_5+$ material, based on the amount of normal butane which was converted by a single pass through the disproportionation reaction zone at the various respective temperatures. Thus, the ultimate yield of $C_5+$ is determined from the single pass laboratory data by dividing the percent $C_5+$ yield by the fraction of total conversion of the normal butane fed to the disproportionation reaction zone. The fractional conversion of normal butane includes, of course, the quantity of normal butane which was converted to lower molecular weight hydrocarbons, as well as that portion of the normal butane which was converted to more valuable higher molecular weight hydrocarbons.

Curve B of FIG. 1 shows the total conversion of normal butane to the higher and lower molecular weight products for single pass operation through the disproportionation reaction zone. The data for curve B were obtained in essentially the same manner as that for curve A. The data are tabulated in Table I. As can be seen from curve B, the conversion rises sharply in moving from relatively low temperatures such as 650° F. to reach a maximum at a point somewhere between 800° and 850° F. However, although the conversion is higher, according to the graph, at a temperature somewhat in excess of 800° F., it is clear that our findings establish that it is much preferable to operate at a temperature below about 800° F. in order to achieve relatively high yields of the valuable higher molecular weight hydrocarbons. As the temperatures are raised up to 800° F. and above, the conversion goes up, largely because substantial light hydrocarbons are generated, possibly due to cracking. However, at the preferred operating temperatures of below 800° F., there is substantially greater ultimate yield of $C_5+$ material, as is indicated by curve A of FIG. 1.

Furthermore, the relatively high olefin concentration in the product from the reaction zone when operated at 875° F. versus the relatively low olefin concentration when operating at the lower temperatures, as can be seen from the data tabulated in Table I above, illustrates the advantage of operating the saturated hydrocarbon disproportionation zone in the presence of no more than about 5 weight percent olefins and preferably substantially less olefins, as, for example, less than 1 weight percent olefins.

Results which are qualitatively similar to those shown in FIG. 1 were obtained using a catalyst mass consisting of Pd on $Al_2O_3$ particles mixed with $WO_3$ on $SiO_2$ particles. These results are tabulated in summary form in Table II.

TABLE II

| | Temperature, ° F. | | | |
|---|---|---|---|---|
| | 700 | 750 | 800 | 850 |
| $C_5+$, ultimate yield | 37 | 41.5 | 39 | 31 |
| Deactivation rate[1] | 0.04 | 0.039 | 0.038 | 0.069 |
| Pressure, p.s.i.g | 900 | 900 | 900 | 900 |
| LHSV | 1.0 | 1.0 | 1.0 | 1.0 |
| Feed | $nC_4$ | $nC_4$ | $nC_4$ | $nC_4$ |

[1] Deactivation rate = $-d\{\log(\text{conversion to } C_5+)\}/dt$, i.e., the deactivation rate is calculated as the rate of change (decrease) of the logarithm of the per pass conversion to $C_5+$ per unit time, e.g., per hour.

Figure 2:
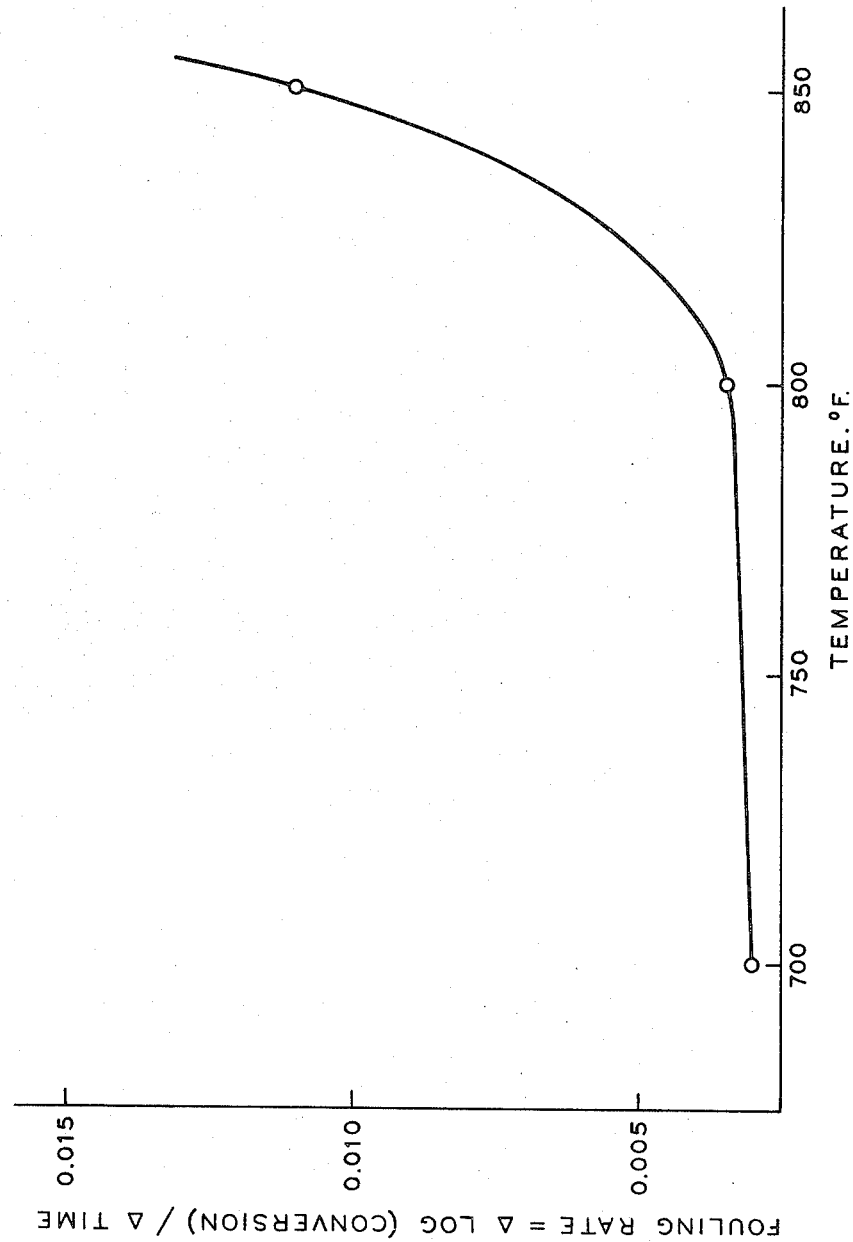
FIG. 2 is a graph showing catalyst fouling rate versus temperature for the disproportionation of normal butane.

Referring now in more detail to FIG. 2, it can be seen from the curve in FIG. 2 that considerably greater disproportionation catalyst fouling rates result from operation above 800° F. and that temperatures of 850° F. or higher appear to be particularly undesirable from the standpoint of catalyst fouling rate. The following conditions were employed to obtain the data used for plotting the curve in FIG 2.

Feed: Normal butane.
Volume of catalyst in reactor: 10 cubic centimeters (cc.).
Type of catalyst:
    ~2.2 cc. of 0.5 wt. percent Pt; 0.5 wt. percent Li on $Al_2O_3$.
    ~7.8 cc. of 8.0 wt. percent $WO_3$ on $SiO_2$.
    Both catalyst particles were 28 to 60 Tyler mesh size and were mixed together well.
Operating conditions:
    Temperature: 700°, 800°, 850° F.
    Pressure: 900 p.s.i.g.
    Feed rate: 10 cc./hour.
    LHSV: 1.0.

Figure 3:
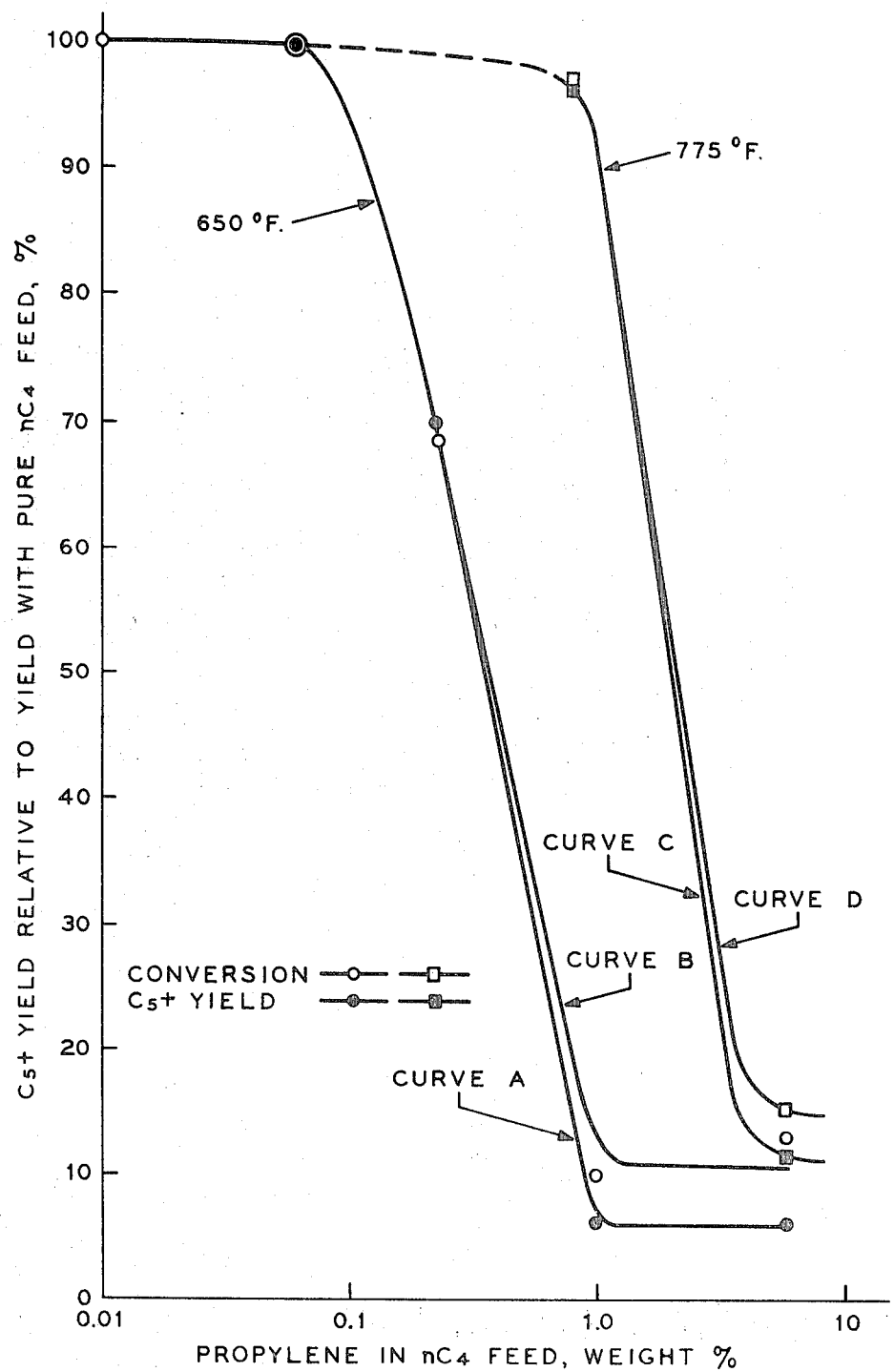
FIG. 3 is a graph showing relative $C_5+$ yield versus the weight percent olefin added to a normal butane feed to a disproportionation reaction zone.

Referring now in more detail to FIG. 3, it can be seen that the injection of olefins to the disproportionation reaction zone is extremely detrimental when carrying out the disproportionation of saturated hydrocarbons. The reaction conditions used to obtain the data to plot curves A and B in FIG. 3 were obtained under essentially the same conditions as described above with respect to FIG.

1, except that varying amounts of propylene were added to the normal butane feed and the temperature was maintained at 650° F. for the data points of curves A and B of FIG. 3. As can be seen from these curves, when operating the reaction zone at 650° F. both the conversion and the yield of valuable C₅+ hydrocarbons was substantially unaffected when only about 0.08 volume percent propylene was added to the normal butane feed to the disproportionation reaction zone. However, when about 0.4 volume percent propylene was added to the normal butane feed, the C₅+ yield dropped about 30 percent relative to what the C₅+ yield was prior to the addition of propylene to the normal butane feed. Still further, when about one percent propylene was added, both the C₅+ yield and the conversion of normal butane dropped to about 10 percent of what the yield and conversion were when no propylene was added to the normal butane feed.

Thus, the data presented by curves A and B of FIG. 3 show that it is undesirable to have substantial amounts of olefins in the feed to the reaction zone and also indicates that it is preferable to operate the disproportionation reaction zone in the presence of less than 1 weight percent olefins when the disproportionation reaction is carried out at temperatures of about 650° F. or lower. We have found that somewhat higher amounts of olefins may be tolerated in the disproportionation reaction zone at higher temperatures. Thus, at temperatures of about 775° F., somewhat greater amounts of olefins may be present without seriously retarding the saturated hydrocarbon disproportionation as is indicated by curves C and D in FIG. 3. But it is important to maintain the olefins below about 5 weight percent, and still more preferable to maintain the olefins at less than about 2 weight percent, in the disproportionation zone when operating at temperatures of about 750° to 800° F.

In this respect, it can be calculated from dehydrogenation equilibria data that at temperatures below about 800° F. the olefin concentration resulting from a normal butane-olefin equilibrium is below about 2 weight percent at 900 p.s.i.g.

Although various embodiments of the invention have been described, it is to be understood that they are meant to be illustrative only and not limiting. Certain features may be changed. It is apparent that the present invention has broad application to the disproportionation of saturated hydrocarbons. Accordingly, the invention is not to be construed as limited to the specific embodiments or examples discussed but only as defined in the appended claims.

I claim:

1. In a process for disproportionation of saturated hydrocarbons which comprises contacting the saturated hydrocarbons in a disproportionation reaction zone, with a catalytic mass having a component with catalytic activity for alkane dehydrogenation and the second component with catalytic activity for olefin disproportionation, the improvement which comprises carrying out said contacting at a temperature between 400° and 800° F., and in the presence of no more than 5 weight percent olefins, and withdrawing from the disproportionation reaction zone product saturated hydrocarbons containing no more than 5 weight percent olefins.

2. In a process for disproportionation of saturated hydrocarbons which comprises contacting the saturated hydrocarbons in a disproportionation reaction zone, with a catalytic mass having a component with catalytic activity for alkane dehydrogenation and a second component with catalytic activity for olefin disproportionation, the improvement which comprises carrying out said contacting at a temperature below about 800° F., and at an elevated pressure of at least 100 p.s.i.g., and in the presence of no more than 0.5 weight percent olefins.

3. A process in accordance with claim 1 wherein the improvement is made which comprises using as said catalytic mass, a catalytic mass comprising catalyst particles having both catalytic activity for dehydrogenation and catalytic activity for olefin disproportionation.

4. A process in accordance with claim 1 wherein the catalytic mass comprises a physical mixture of (a) catalyst particles containing a component which has catalytic activity for alkane dehydrogenation, and (b) catalyst particles containing a component which has catalytic activity for olefin disproportionation.

5. A process in accordance with claim 1 wherein the saturated hydrocarbons consist essentially of alkanes.

6. A process in accordance with claim 1 wherein the temperature is between 500° and 700° F.

7. A process in accordance with claim 5 wherein the saturated hydrocarbons consist essentially of just one carbon number hydrocarbons selected from the group consisting of propane, normal butane, and normal pentane.

References Cited

UNITED STATES PATENTS

| | | | |
|---|---|---|---|
| 1,687,890 | 10/1928 | Ramage | 260—683.15 |
| 3,445,541 | 5/1969 | Heckelsberg et al. | 260—683 |
| 3,484,499 | 12/1969 | Lester et al. | 260—673 |
| 3,432,568 | 3/1969 | Miale et al. | 260—673 |

DELBERT E. GANTZ, Primary Examiner

J. M. NELSON, Assistant Examiner

U.S. Cl. X.R.

260—683 D

UNITED STATES PATENT OFFICE
CERTIFICATE OF CORRECTION

Patent No. 3,775,505      Dated November 27, 1973

Inventor(s) Thomas R. Hughes

It is certified that error appears in the above-identified patent and that said Letters Patent are hereby corrected as shown below:

Col. 1, line 63, "catlytic" should read --catalytic--.

Col. 6, lines 38-40, "refractory support and a Group VI-B metal, or metal compound, on a refractory support" should read --refractory support--.

Col. 7, line 23, "olfins" should read --olefins--.

Col. 8, line 41 "C+" should read --$C_5^+$--.

Col. 9, line 6, "valuble" should read --valuable--.

Signed and sealed this 13th day of August 1974.

(SEAL)
Attest:

McCOY M. GIBSON, JR.
Attesting Officer

C. MARSHALL DANN
Commissioner of Patents